Sept. 20, 1966 C. J. STALEGO 3,274,324
APPARATUS FOR FORMING HEAT-SOFTENABLE MATERIALS
Original Filed Oct. 30, 1961 4 Sheets-Sheet 2
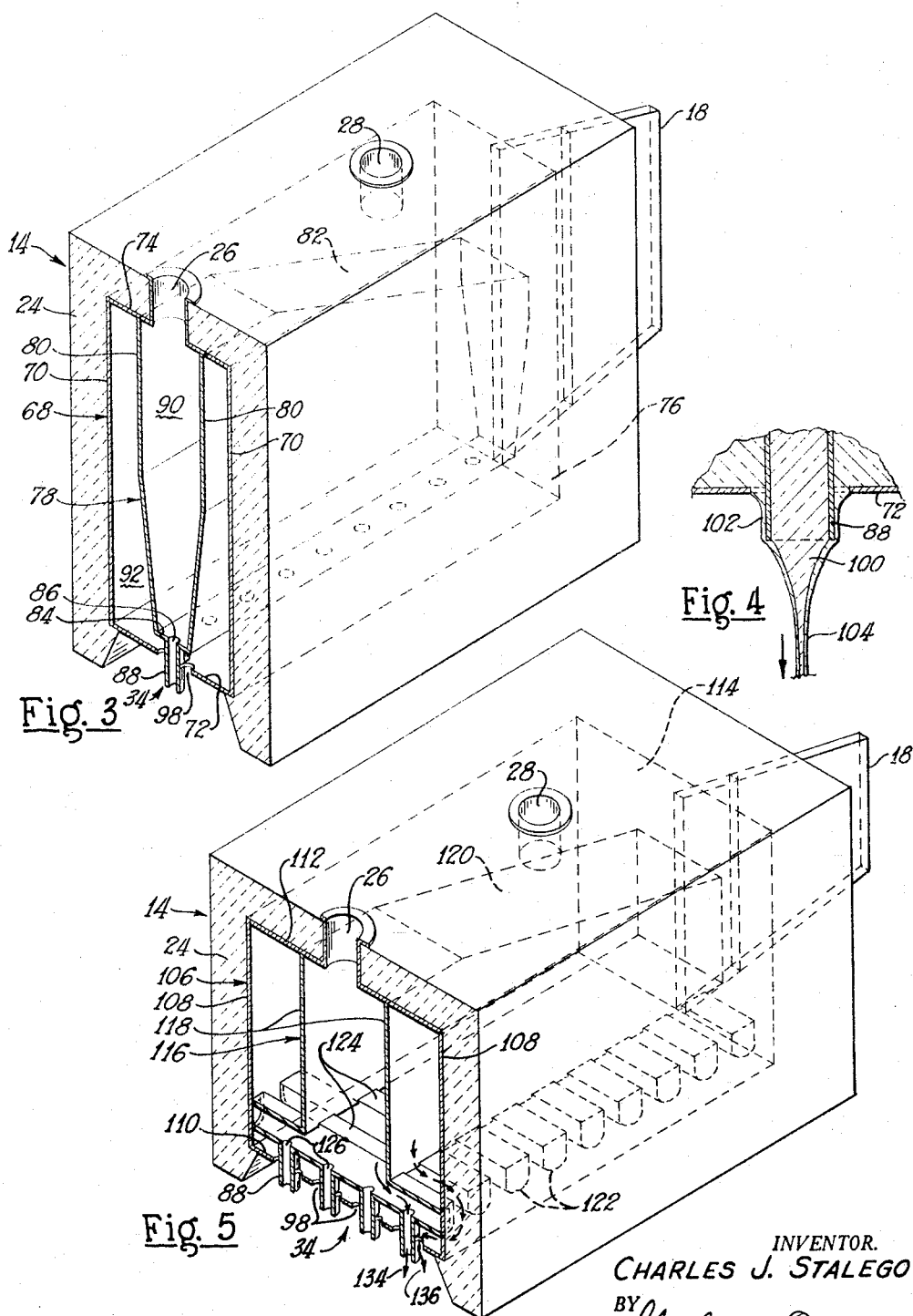
INVENTOR.
CHARLES J. STALEGO
BY
Stachi & Overman
ATTORNEYS Sept. 20, 1966  C. J. STALEGO  3,274,324
APPARATUS FOR FORMING HEAT-SOFTENABLE MATERIALS
Original Filed Oct. 30, 1961  4 Sheets-Sheet 3

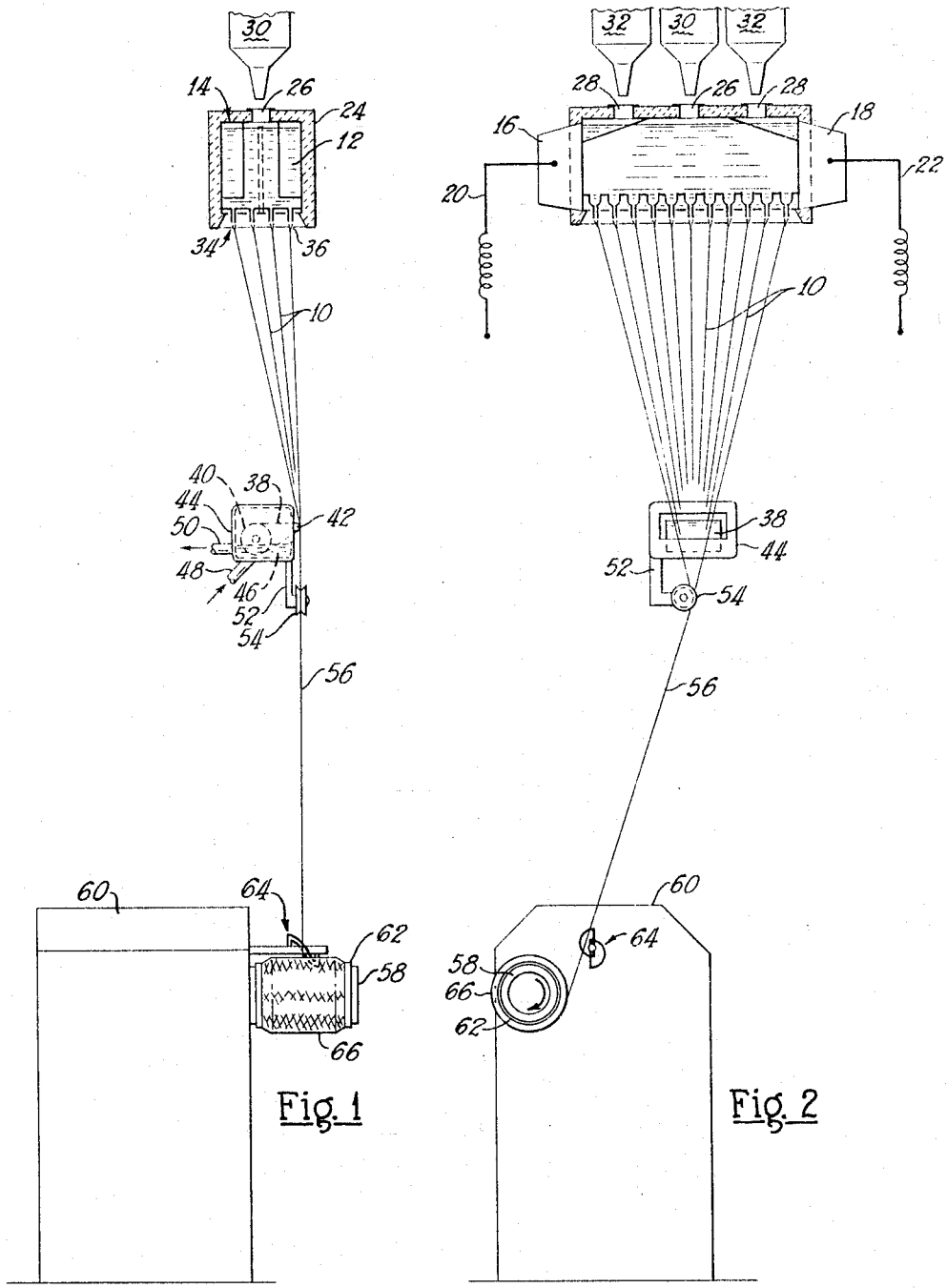

INVENTOR.
CHARLES J. STALEGO
BY
ATTORNEYS

United States Patent Office 3,274,324
Patented Sept. 20, 1966

3,274,324
APPARATUS FOR FORMING HEAT-SOFTENABLE MATERIALS
Charles J. Stalego, Newark, Ohio, assignor to Owens-Corning Fiberglas Corporation, a corporation of Delaware
Original application Oct. 30, 1961, Ser. No. 148,460, now Patent No. 3,192,023, dated June 29, 1965. Divided and this application Feb. 26, 1965, Ser. No. 446,445
7 Claims. (Cl. 13—6)

This application is a division of application Serial No. 148,460, filed October 30, 1961, now Patent No. 3,192,023.

This invention relates to a method and apparatus for processing heat-softenable materials, and more particularly to a method and apparatus for producing multi-layered fibers from heat-softenable materials.

It is well known that fibers can be produced from many different kinds of materials including glass, synthetic resins and the like. Among these materials, a wide range of properties is displayed. Thus, some glasses are extremely soft and without strength. These glasses are in many events characterized by lower cost due to the starting materials used in their production. Also, there are glasses that have extremely high strength and many of these glasses, due to more expensive starting materials used in their fabrication, are more expensive. Further, fibers can be produced from such materials as aluminum oxide which has particularly outstanding refractory properties such as high heat resistance as contrasted to some of the lower melting glasses. However, aluminum oxide and the other refractory materials are generally characterized by relatively low strength and brittleness.

If a method and apparatus could be devised whereby uniform but very thin coatings of high modulus mineral materials could be applied to a core or fiber of lower modulus but cheaper material, the more expensive high modulus material could be substantially extended and act as a strength-imparting casing for the cheaper core material to provide novel and improved products. Also, as in the case of a refractory material such as aluminum oxide, it could be used around a core of cheaper material to lend its high temperature resistant properties and in turn the core material could provide a desired degree of flexibility and resistance against breakage. It will be readily apparent that many desirable combinations of multi-layered fibers could be provided if a suitably controlled method and apparatus were available to form these materials.

Heat-softenable synthetic resins also display varying properties and differences in cost that would provide improved products when used in combination in multi-layered fibrous products.

Thus, provision of a method and apparatus for producing multi-layered fibers of carefully controlled composition and layer thickness would provides a valuable step forward in the art of synthetic fiber materials, extending their uses substantially and providing properties not now present in single composition fibrous materials.

Accordingly, it is an important object of the present invention to provide a novel method and apparatus for processing heat-softenable materials.

Another object is to provide a method and apparatus for producing multi-layered fibers from heat-softenable mineral materials.

A further object is to provide a method for producing multi-layered fibers from glass and analogous heat-softenable mineral materials.

A further object is to provide an apparatus for producing multi-layered fibers from glass and analogous heat-softenable mineral materials.

A more particular object is to provide a method for producing multi-layered fibers of heat-softenable materials wherein the core of the fiber is drawn from a hollow, elongated orifice and the covering coating or outer layer of the fiber is formed by feeding a molten material over the core-forming orifice to blend with the formed core.

A still further object is to provide apparatus for producing multi-layered fibers of heat-softenable materials wherein a single tip is employed for the formation, the tip being utilized to guide and form both inner and outer layers, with the outer layer being formed by passing molten material over the outside of the tip to blend with and cover the material flowing through the tip to form a two-layer fiber construction.

It is also an important object of the present invention to provide a method and apparatus for forming heat-softenable materials into multi-layered fibers utilizing a melter-feeder made of oxidation-prone refractory metal by virtue of the fact that the melter-feeder is operated while submerged or completely coated with an oxygen-excluding glass film to prevent oxidation.

Other objects of this invention will appear in the following description and appended claims, reference being had to the accompanying drawings forming a part of this specification wherein like reference characters designate corresponding parts in the several views.

In the drawings:

FIGURE 1 is a generalized showing of a side view of apparatus used for the production of continuous glass fibers, illustrating the process of their formation, and incorporating the present invention for forming multi-layered fibers;

FIGURE 2 is a front view of FIGURE 1;

FIGURE 3 is an isometric view, with parts in section, illustrating one form of apparatus of the present invention utilizing one row of fiber-forming tips;

FIGURE 4 is an enlarged fragmentary section view illustrating the flow of molten material through a tip assembly utilized in the embodiments of FIGURES 3 and 5, 6 and 7;

FIGURE 5 is an isometric view, similar to FIGURE 3, illustrating a second form of apparatus of the present invention utilizing multiple rows of fiber-forming tips;

Figure 6:
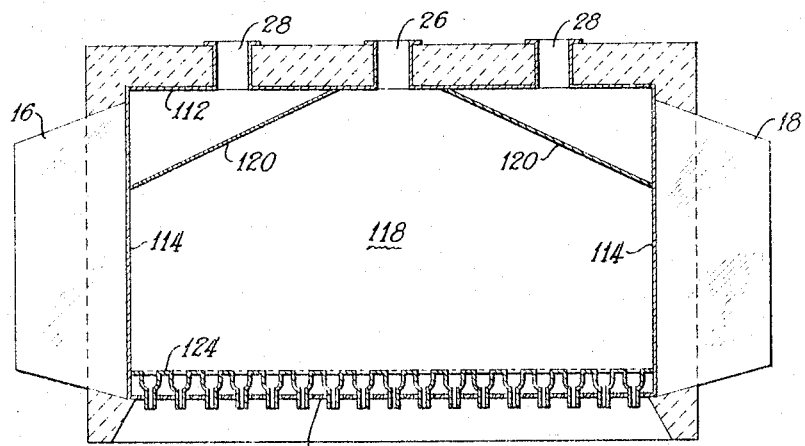
FIGURE 6 is a longitudinal sectional view of the apparatus of FIGURE 5.

Before explaining the present invention in detail it is to be understood that the invention is not limited in its application to the details of construction and arrangement of parts illustrated in the accompanying drawings, since the invention is capable of other embodiments and of being practiced or carried out in various ways. Also, it is to be understood that the phraseology of terminology employed herein is for the purpose of description and not of limitation.

*Brief perspective*

Briefly, the present invention relates to a method and apparatus for producing multi-layered fibers from heat-softenable materials and particularly from heat-softenable mineral materials such as glass, wherein a single tip is operated in such a manner that both the interior and exterior surfaces thereof are utilized for feeding heat-softenable materials in multi-layered fiber forming fashion.

Thus, in accordance with the invention, a melter-feeder is provided that contains separated compartments for first and second heat-softenable material. From the first compartment a fiber-forming orifice is extended that passes through a wall of the second compartment. In the wall of the second compartment and around the fiber-forming orifice or tip, there is provided one or more openings for feeding molten material from the second compartment around the outside of the tip to provide an outer layer on the core produced thereby.

The invention also includes a fence around the fiber-forming orifice assembly for preventing migration of molten materials over the tip section.

The scope of the invention also includes a dual compartmented bushing or melter-feeder wherein the outer portion of the tips are provided with molten material through a slot between the two compartments, with provision for controlling the rate of feeding of both the core and covering materials to provide desired amounts of these materials in the layers of the fibers produced.

These briefly-described aspects of the invention will now become more clear from reading the following elaborated description.

*The environment*

As shown in FIGURES 1 and 2, continuous fibers 10 of heat-softenable materials are formed, according to the multi-layer concept and method of this invention, from a molten body 12 of the material that is produced within a melter-feeder 14 made in accordance with the present invention. The melter-feeder 14 is of metal that is adapted to be heated by electrical energy applied thereto and for such purpose is provided with electrical terminals 16 and 18 at each end, as best shown in FIGURE 2, and these are connected with electric lines 20 and 22 whereby electric current can be passed through the bushing to provide a suitable and carefully controlled temperature for producing the molten body 12.

The melter-feeder 14 is suitably covered with a heat-retaining layer of refractory material 24 to retain heat and improve melting efficiencies and provide uniform temperatures throughout the molten body 12. At the top, the melter-feeder 14 is provided with inlet openings 26 and 28 and in alignment above these openings there are provided feed hoppers 30 and 32 for storage of pulverulent materials to be fed into the bushing 14 for melting therein.

In the bushing or melter-feeder 14, the materials fed from the hoppers 30 and 32 are melted by the heat of the bushing to form the molten body 12 and the molten material therefrom exudes downwardly through the bottom through tip assemblies 34, to be further described in greater detail since they constitute substance of the present invention. The motlen material issues from and over the tip assemblies 34 as small streams 36 and the streams are attenuated or reduced in diameter to form the fibers 10. In case of production of glass fibers, the fibers are passed into tangential contact with a sizing belt 38 operating over a roll 40 and a guide member 42. The roll 40 is positioned within a size container 44 that carries a body of liquid size 46 with the bottom portion of the roll 40 being immersed in the liquid size and as the belt 38 passes thereover, it is wetted to transfer the size to the fibers during their tangential passage over the guide 42. An inlet conduit 48 supplies fresh size to the container 44 and an exhaust conduit 50 returns the size to a central source for circulation and reconstitution to assure a fresh supply.

A depending arm 52, attached to the size container 44, supports a gathering guide 54 that takes the form of a small wheel having a V-shaped groove in the periphery thereof and that is made of a wear-resistant material. The wheel form is used so that as wear develops at one spot, by passage of the fibers thereover, the wheel can be indexed a few degrees to bring a new gathering surface into position.

After the fibers 10 pick up a coating of the liquid size and binder 46 by tangential contact with the wetted belt 38 at the guide 42, they are converged into a strand 56 at the V-periphery of the gathering guide wheel 54.

The strand 56 passes downwardly to a cylindrical collet 58 that is adapted to be rotated by a motor, not shown, contained within the cabinet 60, and the collet carries a tube 62 upon which the strand 56 is wound. As the strand is wound, it is directed back and forth over the surface of the tube 62 by a traversing mechanism 64, also operated from the cabinet 60, to form a package 66. Rotation of the collet 58 and the tube 62, carried thereby, to wind the strand 56 provides the attenuating force whereby the small streams 36 are drawn out into the extremely small diameter fibers 10.

Movement of the strand 56 in a to-and-fro manner across the surface of the tube 62 by the traverser 64 provides point contact between successive turns of the strand and thereby prevents sticking of the turns to one another when the liquid binder and size is dried.

*The method and apparatus of invention—The FIGURE 3 embodiment*

In accordance with the present invention, the fibers 10 are adapted to be formed as multiple layers to provide the unique and advantageous properties heretofore mentioned. Thus, as shown in FIGURE 3, the bushing or melter-feeder 14 is defined exteriorly by a box-like housing 68, having side walls 70, a bottom 72, a top 74 and ends 76. The terminals 16 and 18 are attached to the ends 76, and are vertically aligned and positioned centrally of the ends to provide uniform flow of electric current therethrough.

The bushing 14 is divided into an inner bushing or compartment 78 that includes side walls 80 which extend to the top 74 of the box-like housing 68 centrally thereof, but taper down toward the ends to the end walls 76 of the housing 68, being covered by end top sections 82 that, like the sides 80 are connected at their ends to the end walls 76 of the outer housing 68. The side walls 80 are joined along their bottom edges to a bottom 84 that is spaced above the bottom 72 of the outer housing 68. It will be noted that a plurality of planar apertures 86 in single aligned relationship are formed in the bottom 84 and that tubular orifices 88 are connected to the apertures to extend through corresponding apertures in the bottom 72 of the outer casing 68.

Thus, from the foregoing, it will be understood that the inner walls 80, bottom 84 and top walls 82 provide an inner chamber 90 and that the outer housing 68 provides an outer chamber 92 in surrounding relationship to the inner chamber. Thus, two different kinds of molten materials can be accommodated by the bushing 14 in isolated relationship.

The top wall 74 of outer housing 68 is provided centrally with the aperture 26 and at each end with the apertures 28. The apertures 26 is in communication with the inner chamber 90 and the end apertures 28 are in communication wtih the outer chamber 92. The apertures 26 and 28 are lined with metal of which the top wall 74 is made and provided with protective lips extending back over the edge of the refractory 24 so that different materials can be fed through the apertures 26 and 28 without contacting or eroding the relatively soft refractory.

As previously mentioned, the orifices or tips 88 extend from the bottom 84 of the inner chamber 90 downwardly through the bottom 72 of the outer chamber 92. Molten material from the inner chamber 90 thus flows through the orifices 88. To provide for dual layer fiber formation in accordance with the present invention, flow of molten material from the outer chamber 92 downwardly over the outside of the orifices 88 is also provided. Thus, as shown in FIGURE 3 and also in FIGURE 8, a plurality of planar apertures 98 are formed in the bottom wall 72 at equally spaced points around the orifice or tip 88 and in tangential relationship with the exterior surface thereof. The apertures 98, as shown, are circular, with their axes displaced from the axis of orifice 88, but in aligned axial relation thereto.

*Operation of the FIGURE 3 embodiment*

By reference to FIGURES 3 and 4 it will be observed that a first fiber forming material is produced in molten form in the inner chamber 90 of the bushing 14 and a second fiber forming material is produced in molten form in the isolated relation with respect thereto in the outer chamber 92 by the addition of appropriate materials through the apertures 26 and 28 and introduction of electrical current into the metal of the bushing to develop a melting environment.

As shown in FIGURE 4, the molten material produced within the inner chamber 90 flows through the interior of the hollow tubular tip 88, through the bottom orifices 86 to form a core 100 of the fiber 10; also the molten material from the outer chamber 92 flows through the holes 98 of the bottom 72 of outer housing 68 and migrates as a generally tubular or frusto-conical film 102 over the exterior of the tip 88, moving downwardly over the outside of the core 100 to form a fiber case, covering or outer layer 104. By concomitant attenuation, a multilayer fiber is produced.

*The FIGURE 5 embodiment*

Figure 7:
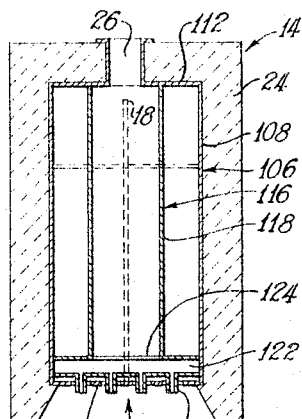
FIGURE 7 is a transverse sectional view of the apparatus of FIGURES 5 and 6.

As shown in FIGURES 5, 6 and 7, a labyrinthine bushing 14 is provided wherein a plurality of rows of fiber-forming tips 34 are utilized to provide strands 56 as in FIGURES 1 and 2. This permits a greater number of individual fibers to be formed in a given longitudinal space than in the FIGURE 3 embodiment.

Although the exterior configuration of the bushing of the FIGURES 5, 6 and 7 embodiment is generally similar to the FIGURE 3 embodiment, the interior arrangement of walls is different to provide for the greater number of multiple-layer orifices 34, and accordingly to avoid confusion between the two embodiments of the invention, different numerals will be applied to the elements thereof. Thus, the embodiment of FIGURES 5, 6 and 7 includes a box-like housing 106 having side walls 108, a bottom 110, a top 112 and ends 114. Terminals 16 and 18 are applied to the end walls 114 for conducting current into the unit. An inner housing 116 is defined within the confines of the outer housing 106 by means of side walls 118 which, as shown in FIGURE 6 are joined centrally to the top 112, tapering downwardly from the top toward the end walls 114 and being covered by slanted top sections 120.

The inside walls 118 terminate at their bottom edges a substantial distance above the bottom 110 of the outer housing 106 and a plurality of tubes or troughs 122 are positioned transversely across the bottom ends of the walls 118, being connected at their ends to the walls 108 of the outer casing 106 in fluid-sealed relation. The portions of the tubes 122 between the walls 118 and 108 are closed; however, the portions within the walls 118 are open at the top so that fluid materials generated within the inner compartment 116 can flow into the tubes 122, the length thereof. Bridging portions 124 are provided between the walls 118 and the tubes 122 to provide a floor of the inner compartment 116 between the walls 118.

Figures 8, 9:
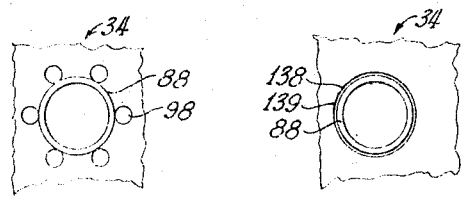
FIGURE 8 is a fragmentary bottom plan view of one fiber-forming tip embodiment of he invention with multiple holes surrounding the tip for feeding an outer layer of heat-softenable material.
FIGURE 9 is a fragmentary bottom plan view of a second fiber-forming tip embodiment of the invention with a concentric ring surrounding the tip for feeding an outer layer of heat-softenable material.

Each of the tubes 122 is provided along the bottom thereof with spaced apertures 126 and tubular tips 88 are connected into the apertures and extend downwardly through apertures in the bottom 110, in fluid-sealed relation. As in the embodiment of FIGURE 3, and as shown in FIGURE 8, each of the tips 88 is surrounded with a plurality of apertures 98, tangentially exposed for feeding molten materials down around the outside of the tip.

The top 112, as shown in FIGURE 6, is provided with the central opening 26, that communicates with the interior of the inner compartment 116 for feeding pulverulent materials thereto for melting, and at the ends with the openings 28, communicating with the interior of the outer housing 106 so that pulverulent materials can be fed thereto in separated relationship.

*Operation of the embodiment of FIGURES 5, 6 and 7*

From the foregoing, it will be observed that when pulverulent materials of a first kind are fed to the inner compartment 116 through the opening 26 and pulverulent materials of a second kind are fed to the outer housing 106 through the openings 28, molten bodies will be formed in each chamber in isolated relationship. The molten material formed in the inner compartment 116 will flow downwardly and out the interior length of the tubes 122, through the apertures 126, and down through the center of the tips 88. This flow is illustrated by the arrow 134.

The molten material formed in the outer chamber or housing 106 flows down between the tubes 122 and through the openings 98 around the tips 88 as represented by the arrow 136. From this point, fiber formation takes place in the same manner as described above with relation to the FIGURE 4 embodiment.

From the foregoing, it will be understood that the embodiment of FIGURES 5, 6 and 7 provides a plurality of rows of apertures, as distinguished from the embodiment shown in FIGURE 3 of the drawings.

*Alternate outer flow orifice arrangement*

As shown in FIGURE 8, one form of tip arrangement 34 that may be utilized in the present invention comprises a tubular orifice or tip 88 having a plurality of openings 98 in surrounding relationship thereto and in tangential contact to provide an outer flow film of molten material over the exterior surface of the tip 88. Alternately, as shown in FIGURE 9, the holes 98, surrounding the tip 88 can be replaced by an annular opening 138, formed by inserting the tip in spaced relation through a planar aperture 139, formed in the bottom wall 72 of the embodiment of FIGURE 3 or the bottom wall 110 of the embodiment of FIGURES 5, 6 and 7. This will provide for the formation of an outer layer of molten material flowing over the exterior surface of the tip 88. When so operating, it will be desirable to center the tip 88 carefully within the annular opening 138 to provide a uniform film all around the tip. This arrangement may be desirable in those instances where molten materials of such viscosity are encountered that ridges might tend to be produced by the arrangement of FIGURE 8 by the lack of spreading of the streams issuing from the holes 98, due to the voscity characteristics of the outer molten material. Although a concentric arrangement may be preferred, an eccentric arrangement can be used for special effects as for forming curly fibers or those having a heavier outer coating on one side than on the other.

Anti-migration fences

In some instances in the use of the present invention, materials of lower viscosity at forming temperatures, such as the more fluid glasses, may have a tendency to migrate across the bottom 72 of the embodiment of FIGURE 3 or the bottom 110 of the embodiment of FIGURE 5 as when these surfaces are very hot. To avoid such migration it is to be considered within the scope of the invention to utilize anti-migration fence arrangements surrounding the tips, as shown in FIGURES 10, 11, 12, 13 and 14.

Figure 10:
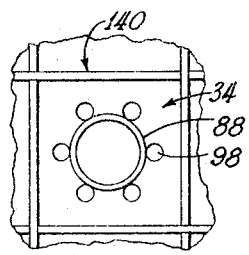
FIGURE 10 is a fragmentary bottom plan view of the first tip embodiment as shown in FIGURE 8, provided with a square fence to prevent migration of the outside covering material.
Figure 11:
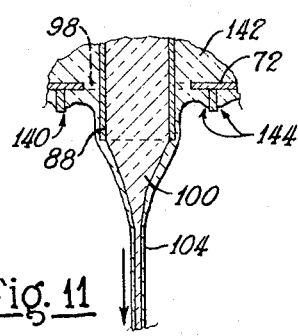
FIGURE 11 is a sectional view through FIGURE 10.

As shown in FIGURES 10 and 11, each tip assembly 34 is surrounded by a square fence 140, suitably made of bar stock of rectangular section, FIGURE 11, and placed in checkerboard array along the underside of the bottom of the bushing. As shown in FIGURE 11, when the molten material 142, flows down the outside of the tubular tip 88 through the aperture 98, it may migrate along the bottom, typified by 72, to encounter the fence 140 that provides freeze points as at 144, which are effective to prevent migration and also prevent drippage.

Figure 12:
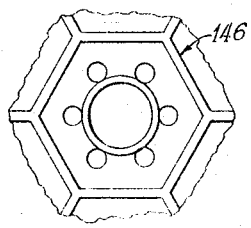
FIGURE 12 is a fragmentary bottom plan view of the first tip embodiment as shown in FIGURE 8, provided with a hexagonal fence to prevent migration of the outside covering material.
Figure 13:
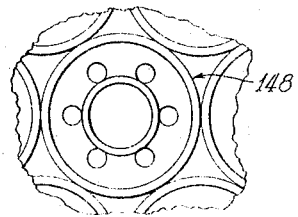
FIGURE 13 is a fragmentary bottom plan view of a single tip provided with a circular fence to prevent migration of the outside covering material.

As shown in FIGURE 12, a hexagonal fence 146 is utilized in a manner similar to the square fence 140 of FIGURES 10 and 11. In FIGURE 13, a circular fence 148 is shown that can also be utilized in accordance with the broad scope of the invention.

Figure 14:
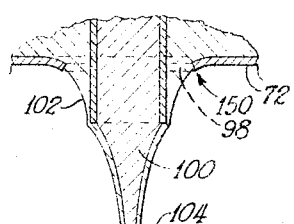
FIGURE 14 is a fragmentary sectional view at one tip as in FIGURES 8 or 9, with the surrounding holes dimpled downwardly to prevent migration of the outside covering material.

In FIGURE 14, an anti-migration device is illustrated wherein the holes 98, as shown in FIGURES 8 or 9 are dimpled downwardly as at 150 to provide freeze points to prevent molten material from migrating along the bottom, typified by 72.

Embodiment of feeder slot along tip section

Figure 15:
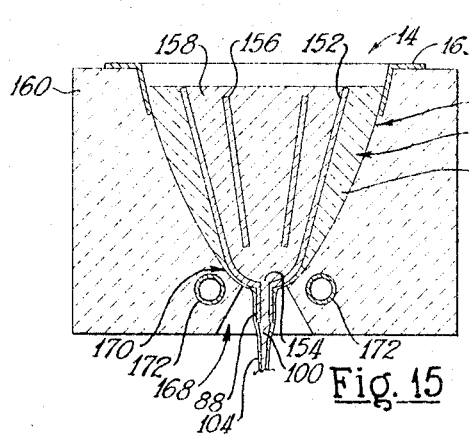
FIGURE 15 is a tranverse section view through a bushing provided with a feeder slot between the base of the bushing and the surrounding refractory for feeding the outside covering material.

As shown in FIGURE 15, the outer layer of glass may be formed by flowing glass downwardly along the exterior surfaces of the bushing and over the tips. In this embodiment, a bushing is utilized that has a generally U-shaped wall 152, having a plurality of spaced apertures 154 formed in the bight portion thereof and having tubular tips 88 connected in fluid flow relationship and extending downwardly for gravity flow of molten materials therethrough. Heater strips 156 are suitably provided within the wall 152, if desired, to improve the uniformity of temperature of the molten material 158 contained by the bushing during production.

In this embodiment of the invention the bushing 14 is cradled within a refractory block 160 having a generally U-shaped channel 162 formed therein, which is generally similar in shape to the U-shaped wall 152, but larger to provide a space 164 on the outside of the wall 152 for retaining a second molten body of different materials 166. It will be noted that the refractory block 160 is provided along the bottom with a channel 168 of generally inverted U-shaped configuration, that joins with the U-shaped channel 162 to provide an opening through which the tip section of the bushing can be inserted. However, it will be observed that the bight portion of the U-shaped wall 152 is positioned in spaced relation slightly above the refractory 160 to provide a narrow slot 170 leading to each side of the tip section.

The refractory is suitably protected against abrasion along the top edge by heat-resistant metal caps 163.

Operation of the FIGURE 15 embodiment

From the foregoing, it will be observed that when suitable materials are fed into the interior of the wall 152 and the space 164 between the wall 152 and the refractory 160, a molten body 158 will be formed within the wall and a molten body 166 will be provided in surrounding relationship to the wall. The material of molten body 158 flows downwardly through the center of the tips 88 and the material from the molten body 166 flows downwardly over the tip section and down over the exterior surfaces of tips 88 to form an outside layer 104, as previously discussed with regard to FIGURE 4. The size of the slit 170, the heat of the U-shaped wall 152 and the flow characteristics of the 166 material will determine the rate of flow of the molten material 166 to form the covering layer 104.

If desired, cooling tubes 172 can be buried in the refractory block 160 adjacent to the slits 170 and a cooled gas or other desirable fluid or liquid can be passed through the cooling tube to adjust or modulate the flow of molten material through the slot or slots 170.

Figure 16:
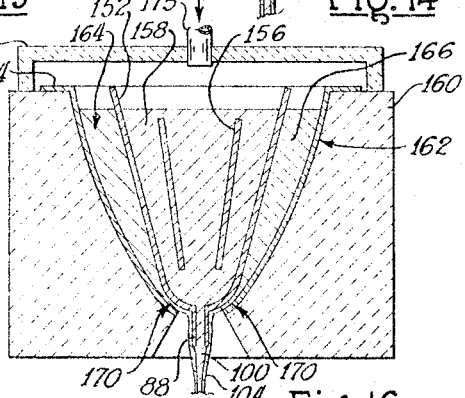
FIGURE 16 is a transverse section view through a bushing similar to FIGURE 15, having a feeder slot along the tip section and with a heated lining for modulating the flow of the outside covering material.

The FIGURE 16 embodiment

The embodiment shown in FIGURE 16 is generally similar to the embodiment of FIGURE 15 but provides means whereby supplemental heat can be applied to the outer molten body 166 to control the rate of flow thereof through the slots 170.

Figure 17:
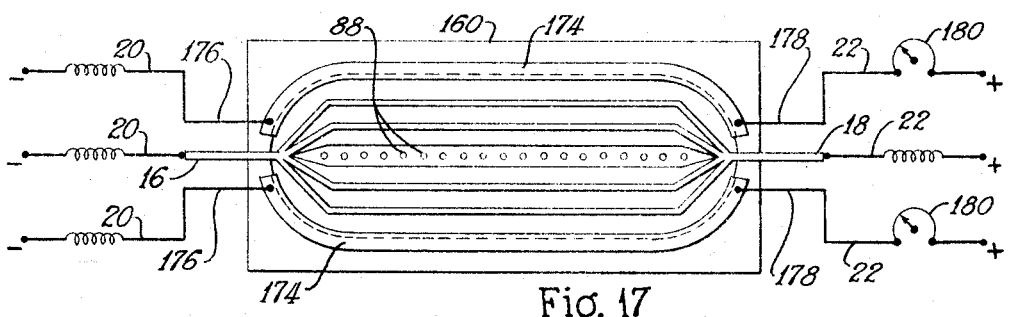
FIGURE 17 is a top plan view of FIGURE 16.

Thus, in accordance with this aspect, a U-shaped wall 152 is utilized in the manner of the previous embodiment with optional heater strips 156. The U-shaped wall 152 is cradled within the U-shaped channel 162 in the refractory block 160 to provide a space 164 adapted to retain a molten body 166. However, in this embodiment, the protective metal caps 163 as shown in FIGURE 15, take the form of liners 174 for the U-shaped channel 162. As shown in FIGURE 17, these liners 174 are electrically isolated at their ends from contact with the terminals 16 and 18 for separate, adjustable electrical control to provide a heating pattern or temperature different from that provided by the U-shaped wall 152. For this purpose, the ends of the liners 174 are provided with terminals 176 and 178 for respective connection to the lines 20 and 22 to provide electric current. The liners 174 are adapted to have adjustable amounts of electric current flowed therethrough to control or adjust the heating thereof and for such purpose rheostats 180 or their equivalent electrical control devices are imposed in the lines 22 as shown in FIGURE 17.

Operation of the embodiment of FIGURES 16 and 17

From the foregoing, it will be observed that when suitable heat-softenable materials are placed in the intrior of the bushing 14, as defined by the U-shaped wall 152 and in the space 164 defined between the exterior of the U-shaped wall 152 and the interior of the liner 174 and electrical energy is applied, separate molten bodies 158 and 166 are formed. The material from the molten body 158 will flow downwardly through the interior of the tips 88 to form a core 100 and the material from the molten body 166 will flow downwardly through the slot 170 and over the exterior of the tips by capillarity to form the casing or covering layer 104 around the core 100 formed by the inner material.

From the foregoing, it will be understood that the amount of heat applied to the liner 174 will be effective to modulate or alter the rate of flow of material through the slots 170 and thereby adjust the thickness of the outer case or covering 104 of the fiber 10.

Extended scope of the invention

Figure 18:
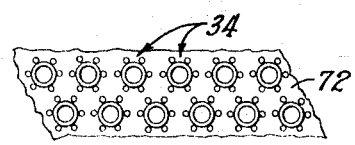
FIGURE 18 is a fragmentary bottom plan view of a staggered tip array, permitting a greater number of tips than a single row.

As shown in FIGURE 18, the tip assemblies 34, when for example utilizing a bushing of the nature of that of FIGURE 3 wherein the bottom is relatively narrow, can be placed in staggered array to provide a greater number of filaments from a given tip section area. When operating in this manner, it may be especially desirable to use one of the fence embodiments as illustrated in FIGURES 10–14 to prevent migration of the outer covering material from one tip to another.

The materials that are adapted to use in producing bushings in accordance with the present invention include the high temperature resistant metals such as platinum, platinum-rhodium alloys, platinum-iridium alloys and similar materials that are oxidation resistant, at high temperatures.

Also, it is to be included within the scope of the invention to use more oxidation-prone metals such as tungsten, molybdenum, iridium, and the like for higher temperature operations. Of course, when using such metals that are subject to oxidation, they must be suitably protected. Accordingly, this may be effected as in the embodiment shown in FIGURE 15 by operating the bushing full of glass or molten material to the top of shortened wall 152 to keep all surfaces covered. Or, the bushing could be operated substantially full and powdered batch or ground cullet piled on top of the molten body to exclude oxygen from the upper edges of the bushing.

When so operating, the protective lip 163 will be fabricated of high-temperature resistant metal such as platinum or one of its alloys, and a sufficient temperature differential maintained between it and the temperature of operation of the wall 152 to prevent melting.

Also, as shown in FIGURE 16, a cover 171 with a gas inlet conduit 175 can be placed over the top of the bushing and lining 174, except when charging, to retain an inert, heavier-than-air gas such as argon, in protective relation over the exposed upper surfaces of the bushing, including the upper edge of the liner 174.

It will be noted that a film of glass moves downwardly over the exterior of the tip section to protect that portion from oxidation. Accordingly, the concept of the invention as illustrated in FIGURES 15–17 lends itself to the use of oxidation-prone metals.

It is also to be included within the scope of the invention to utilize in the concept of FIGURES 15–17 the more common metals such as ordinary iron and steel, protecting them against corrosion by coverage with a layer of the molten material. These materials may be particularly desirable when forming synthetic resin fibers of lower forming temperatures.

While the setting of the present invention has been described with reference to the production of continuous fibers, it will be understood that within the broad scope of the invention the process and apparatus are equally well adapted to the formation of fibers by steam or air-blowing processes and the like. Thus, where there is an attenuation force for fiber formation, the present invention is applicable.

The embodiments of the invention illustrated with respect to the figures of the drawings have indicated that the invention is adapted to the formation of fibers from heat-softenable mineral materials and particularly from glass and related silicious materials. However, it is to be included within the scope of the invention to form dual layer fibers from substantially any material that has a forming viscosity characteristic. Thus, it is to be included within the broad scope of the invention to form dual layer fibers from different kinds of organic materials such as synthetic resins that have compatible temperature ranges and that adhere in film-forming relation as layers. When so operating, of course much lower temperatures would be utilized in the melting chamber and this can be effected by controlling the current flow therethrough.

As regards the formation of dual layer fibers from mineral materials, it is to be included within the scope of the invention to form the core of the fiber of a glass such as E-glass and the coating of a more refractory material such as aluminum oxide or a combination of aluminum oxide with a glass. In this regard, the tip of the bushing can be used to supply a very high modulus material and the outside of the tip, a coating material or glass. Also, this situation can be reversed and the vitreous material pulled from the inside with the high modulus material being supplied to the outside.

In still a further aspect, the present invention can be extended to the coating of mineral fibers by metals having solidification temperature ranges commensurate with the fiber forming temperature ranges and viscosity ranges of the mineral material. Also metal cores may be provided. In another aspect the broad scope of the invention would include the coating of certain high melting synthetic resins with relatively low melting metals such as the lower melting tin-lead alloys and the like, or vice-versa.

In some instances the viscosity characteristics of the outer material may be such as to form very minute ridges over the inner core to provide unique fiber surface properties. Also, with regard to the FIGURE 8 arrangement, the holes 98 may be formed only on one side of the tubular tip 88 for curly fiber or one side layer effects and it is within the scope of the disclosure to have the holes of differing size so that a heavier layer may be applied to one side, analogous to the eccentric arrangement as described for FIGURE 9.

Although the prior description has related to the feeding of two different materials from different compartments, the same material could be produced in each compartment, and in this regard the tip arrangement could be applied to a single compartment to provide fibers having the same material for core and covering.

Broadly, round, square, triangular, hexagonal and other planar openings 98 can be used in either tip embodiment of FIGURES 8 and 9; also the tip 88 can be a hollow elongated orifice of circular, square, hexagonal, triangular or other section and combinations of different planar apertures and tip configurations can be used.

Advantages of the invention

It is an advantageous feature of the present invention that dual layer fibers are produced using a single tip, by utilizing both the interior and exterior surfaces thereof for fiber forming purposes.

It is also an advantage of the invention that both the interior and exterior surfaces of a bushing, as illustrated in FIGURES 15–17 can be put to work to heat fiber forming materials.

It is a further advantage of the present invention that a definite advancement in the art of fiber formation is provided. Thus, fibers of improved properties can be provided such, as by feeding a low strength and perhaps readily deterioratable material to form the core of a fiber, such material being of very low cost, and sheathing or coating such core with an extremely atmospheric resistant and, if desired, high temperature resistant material of very high strength. Inasmuch as the coating material could possibly be relatively expensive it will be observed that the advantages of the expensive material can be utilized in a very economical manner by the fact that less of the material is used than when the entire fiber is made of such material.

Fibers produced in accordance with the present invention can be used as reinforcement materials for synthetic resins and other materials, for weaving cloth and for the other myriad uses which are found for conventional single body fibers. However, it will be obvious that the present invention is advantageous in extending the uses of fibers as by coating ordinary glass with more refractory materials such as aluminum oxide and the like, to render the fibers more weather resistant and more heat resistant and thus adapt them to exposure to more harsh environments than can be withstood over long periods by glass. Thus, it is conceivable that refractory coated fibers produced in accordance with this invention could find use in filtering high temperature gases, as insulation of high temperature zones, such as surrounding rocket engines, re-entrant nose cones, ablation-resistant materials, reinforcement materials that are of higher strength under high temperatures, and the like.

I claim:

1. In apparatus for forming fibers from heat-softenable materials, a container for molten material, said container having a wall, a first planar aperture in said wall, container means including means defining a hollow elongated orifice having ends and a medial exterior portion between said ends, said medial exterior portion being disposed in said planar aperture in fluid sealing relation, and at least one second planar aperture in said wall in tangential contact with said exterior surface.

2. In apparatus for forming fibers from heat-softenable materials, a container for molten material, said container having a fluid retaining wall, said wall having a first planar aperture therein and an external surface, container means including means defining an elongated hollow orifice which is disposed in said aperture in fluid flow relation to said container and extending away from said external surface of said wall, said elongated orifice defining means having an external surface, at least one second planar aperture in said wall in tangential contact with said external surface of said elongated orifice defining means and in fluid flow relation to said container, and antimigration means surrounding said second aperture and said orifice to prevent migration of fluid material over said exterior surface of said wall, comprising an endless member of plate-like section having spaced edges, and means holding one of said edges in contact with said external surface of said wall, to provide freeze points for heat-softenable material.

3. In apparatus for forming fibers from heat-softenable materials, a container for molten material, said container having a heat resistant metal base, means defining a tubular orifice extending outwardly from said base, means for electrically heating said metal base to temperatures sufficient to melt the heat-softenable material, a refractory block having a channel cradling said container and forming a fluid retaining chamber adjacent to the exterior of said container, with an opening in said channel receiving said base in spaced relation to form a fluid flow slot adjacent to the exterior of said base, and cooling means within said block adjacent to said slot, whereby fluid material within said retaining chamber can be flowed through said slot under modulated control and over said base and said means defining said tubular orifice.

4. In apparatus for forming fibers from heat-softenable materials, a first container for molten material, said first container having a base with means defining an elongated hollow orifice extending outwardly therefrom, means for electrically heating said first container to melt the heat-softenable materials, a fluid-containing wall surrounding said first container and to form a second container provided with an opening receiving said base in spaced relation to form a fluid flow slot adjacent to the exterior of said base, and means for heating said second wall to modulate flow of fluid material from said second container through said slot and over said base and said means defining said orifice.

5. In apparatus for forming fibers from heat-softenable materials, a container for molten material, said container having a fluid-retaining wall, means defining an elongated hollow orifice connected to said wall in fluid flow relation to said container and extending outwardly from said wall, said wall being formed of heat-resistant metal, means for electrically heating said wall, a refractory support surrounding said wall and provided with an opening receiving said orifice defining means and spaced from said wall to form a fluid flow slot with the exterior portion of said wall adjacent to said orifice, and a heat resistant metal liner on said refractory support and spaced from said exterior of said wall and electrically isolated therefrom to form a fluid chamber with said exterior of said wall, and means for electrically heating said liner to modulate flow of material from said fluid chamber through said slot.

6. In apparatus for forming fibers from heat-softenable materials,
a first container for fluid material,
said first container having a base with means defining an elongated hollow orifice extending outwardly from said base and exposed directly to the atmosphere,
a fluid-retaining wall surrounding said first container to form a second container, and said second container being provided with a planar opening receiving said elongated orifice defining means in spaced relationship to form a fluid-flow opening adjacent to the exterior of a median portion of said elongated hollow orifice defining means,
and means for heating said second container to melt heat-softenable materials placed therein.

7. In apparatus for forming fibers from heat-softenable materials,
a container for fluid material,
said container having a wall,
a first planar aperture in said wall,
container means including means defining a hollow elongated orifice having ends and a medial exterior portion between said ends,
said medial exterior portion being disposed in said planar aperture in fluid-sealing relation,
and a second opening in said wall at least partially embracing said medial exterior portion of said hollow elongated orifice defining means.

References Cited by the Examiner

UNITED STATES PATENTS

| | | | |
|---|---|---|---|
| 1,318,292 | 10/1919 | Laskey. | |
| 1,750,971 | 3/1930 | Soubier | 65—86 |
| 2,313,296 | 3/1943 | Lamesch | 65—121 X |
| 2,328,998 | 9/1943 | Radford | 65—145 |
| 2,809,393 | 10/1957 | Hauptman | 18—13 |
| 2,900,708 | 8/1959 | Pond. | |
| 2,972,837 | 2/1961 | Pinotti | 65—145 |
| 3,073,005 | 1/1963 | Tiede. | |
| 3,121,254 | 2/1964 | Heynen et al. | |

FOREIGN PATENTS

| | | |
|---|---|---|
| 849,842 | 8/1939 | France. |
| 1,158,476 | 1/1958 | France. |

RICHARD M. WOOD, *Primary Examiner.*

JOSEPH V. TRUHE, ANTHONY BARTIS, *Examiners.*